(No Model.)
G. ROTHGIESSER.
VELOCIPEDE.
No. 442,275. Patented Dec. 9, 1890.
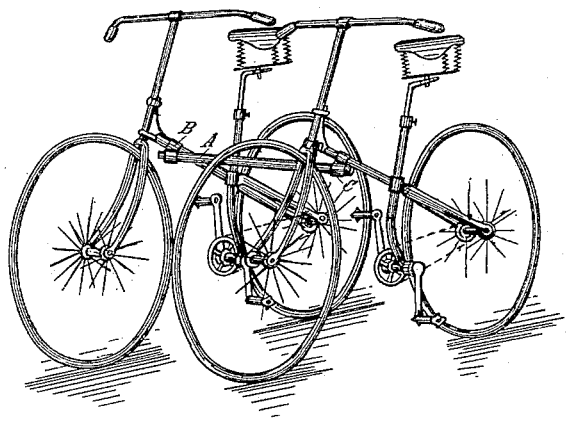
Fig. 1.
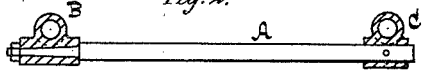
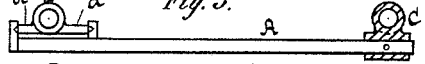
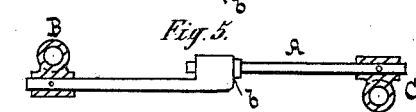
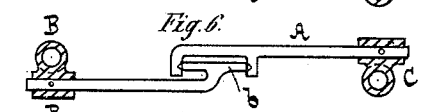
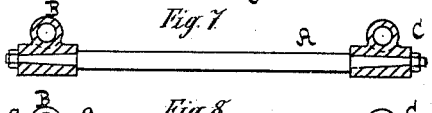
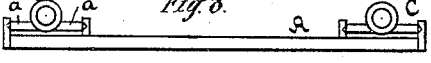
Witnesses:
W. Grunell
H. Faber du Faur
Inventor:
Georg Rothgiesser,
by A. Faber du Faur Jr.
his Attorney.

UNITED STATES PATENT OFFICE.

GEORG ROTHGIESSER, OF ESSEN, GERMANY.

VELOCIPEDE.

SPECIFICATION forming part of Letters Patent No. 442,275, dated December 9, 1890.

Application filed July 1, 1890. Serial No. 357,400. (No model.)

*To all whom it may concern:*

Be it known that I, GEORG ROTHGIESSER, a subject of the King of Prussia, residing at Essen, in the Kingdom of Prussia, German Empire, have invented new and useful Improvements in Velocipedes, of which the following is a specification.

My invention has reference to improvements in velocipedes; and it consists in coupling two twin bicycles together in such a manner as to provide for the unevenness of the road, whereby the danger of straining the frames is avoided.

With this object in view my invention consists, essentially, in a pair of bicycles joined together by a coupling-bar having a loose joint, so that one bicycle can turn about the longitudinal axis of said coupling-bar independently of the other, all of which is more fully pointed out in the following specification and claim and illustrated in the accompanying drawings, in which—

Figure 1 is a perspective view of a pair of bicycles joined together according to my invention. Fig. 2 is a sectional elevation of the coupling-bar detached. Figs. 3 to 8, inclusive, represent various modifications of the coupling-bar.

Similar letters indicate corresponding parts.

In the drawings, referring at present to Fig. 2, the letter A designates the coupling-bar, provided at opposite ends with sockets B and C, respectively, which are attached to the backbones or frames of the bicycles, Fig. 1. In order that one of the bicycles can turn about the longitudinal axis of the coupling-bar independently of the other to provide for unevenness in the road, one of the sockets, as B, is mounted loosely upon the coupling-bar, so as to be capable of turning about its bearings.

In Fig. 2 the coupling-bar is provided with a taper arm having a threaded shank, a shoulder and nut holding the socket upon the arm, all as usual in securing wheels to axles.

In Figs. 4, 5, and 6 the bar consists of two sections coupled at *b* to turn relatively to one another.

In Figs. 3 and 8 the socket is provided with horizontal trunnions *a*, having suitable bearings in ears on the bar.

In Figs. 7 and 8 both sockets are arranged to turn upon the bar.

I am aware that heretofore two bicycles have been united to form a "sociable" or single machine; but in all instances the connections between the two have been rigid.

What I claim as new, and desire to secure by Letters Patent, is—

In combination with two bicycles, a coupling-bar provided with a loose joint and uniting the frames to form a single machine in which one bicycle is free to turn about the longitudinal axis of the coupling-bar independently of the other, substantially as described.

In testimony whereof I have signed my name to this specification in the presence of two subscribing witnesses.

GEORG ROTHGIESSER.

Witnesses:
  G. OELRICHS,
  G. WIEGHARDT.